Patented June 5, 1951

2,555,509

UNITED STATES PATENT OFFICE 2,555,509

STABILIZATION OF ORGANIC COMPOUNDS

Robert H. Rosenwald, Western Springs, Ill., assignor to Universal Oil Products Company, Chicago, Ill., a corporation of Delaware No Drawing. Application April 29, 1947,
Serial No. 744,766

6 Claims. (Cl. 44—63)

This invention relates to the stabilization of organic compounds which tend to deteriorate in storage or in use due to oxidation reactions.

Various organic compounds, including motor fuel, mineral oil, lubricating oil, drying oil, greases, rubber, animal and vegetable fats and oils, etc., are adversely affected by oxygen, with the resultant formation of undesirable gums and usually discoloration of the organic compound, as well as other deleterious reactions.

One object of the present invention is to prevent or at least substantially retard the undesirable deterioration of organic compounds.

Another object of the present invention is to provide a novel inhibitor which will function to stabilize organic compounds which tend to deteriorate due to oxygen.

In a broad aspect the present invention relates to a method of stabilizing an organic substance against deterioration by oxygen which comprises adding thereto a dinitroso compound.

In a specific embodiment the present invention relates to a method of stabilizing an organic compound subject to oxidative deterioration which comprises incorporating therein dinitrosobenzene in an amount of less than 1% by weight.

In another specific embodiment the present invention relates to a method of stabilizing cracked gasoline against deterioration by oxygen which comprises adding thereto from about 0.001% to about 0.1% by weight of dinitrosobenzene.

The preferred dinitroso compound for use as an inhibitor in accordance with the present invention is illustrated in the following general formula:

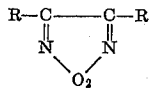

where R is selected from the group consisting of hydrogen and hydrocarbon.

A particularly preferred inhibitor of the present invention is dinitrosobenzene. Other suitable inhibitors include dinitrosoethane, dinitrosopropane, dinitrosobutane, dinitrosopentane, dinitrosotoluene, dinitrosoxylene, dinitrosoethylbenzene, dinitrosopolyethylbenzene, dinotrosopropylbenzene, dinitrosopolypropylbenzene, dinitrosobutylbenzene, dinitrosopolybutylbenzene, dinitrosocyclopentane, dinotrosoalkylcyclopentane, dinitrosocyclohexane, dinitrosoalkylcyclohexane, etc., as well as these ring compounds containing other substituent groups attached to the ring. It is understood that the preferred inhibitors of the present invention comprise those in which the nitrogen atoms are in position ortho to each other, so that there probably is ring formation or other interaction with the oxygen atom or atoms. It is also understood that the various compounds which may be prepared and used in accordance within the broad scope of the invention are not necessarily equivalent.

The inhibitor of the present invention will usually be added to gasoline in an amount of less than 1% by weight and generally in an amount of from about 0.001% to about 0.1% by weight. The exact amount of the inhibitor to be used will depend upon the particular organic compound being treated and upon the stability desired. These inhibitors may also be employed in connection with various dyes, antiknock agents, metal deactivators, synergists or other additives employed for specific purposes in the organic compounds. For example, when used in gasoline, an antiknock agent, such as tetraethyl lead, a dye and perhaps a metal deactivator may be employed in addition to the inhibitor. On the other hand, when used in edible fats and oils, generally a synergist, such as ascorbic acid or phosphoric acid, will generally be added in addition to the inhibitor.

The following examples are introduced to further illustrate the novelty and utility of the present invention without unduly limiting the same.

Example I 0.05% by weight of dinitrosobenzene was added to a Pennsylvania cracked gasoline and the induction period of the original gasoline and the inhibited gasoline were determined. The induction period is a standard method of evaluating the storage stability of gasolines.

The original gasoline without the addition of inhibitor had an induction period of 90 minutes. Upon the addition of 0.05% by weight of dinitrosobenzene, the induction period was increased to 640 minutes.

Example II

Styrene tends to undergo polymerization even in the absence of air. It has been found that the stability of styrene in storage at 100° C. is increased over uninhibited styrene by the addition of dinitrosobenzene. This is illustrated by the following data:

Samples of styrene containing no inhibitor and containing 0.02% by weight of dinitrosobenzene were stored at the conditions mentioned above. It was observed that the sample without inhibitor becomes viscous after 4 to 5 hours in storage, whereas the sample containing inhibitor did not become viscous until 21 hours in storage.

*Example III*

0.02% by weight of dinitrosobenzene was added to lard. The original lard without addition of inhibitor had a stability period of 4½ hours as determined by the "Swift" test. This test is described in detail in the article by A. E. King, H. L. Roschen and W. H. Irwin, which appeared in the Oil and Soap vol. X, No. 6, pages 105 to 109, (1933). In general, this test comprises bubbling air through a sample of the lard until rancidity is determined organoleptically and by peroxide values. The stability period is the number of hours until the lard develops a peroxide number of 20.

Upon the addition of 0.02% by weight of dinitrosobenzene, the stability period of the lard was increased from 4½ hours to 21 hours.

I claim as my invention:

1. An organic compound selected from the group consisting of motor fuel, styrene and edible fats and oils tending to deteriorate containing, as an inhibitor for said deterioration less than 1% by weight of a hydrocarbon dinitroso compound in which the nitrogen atoms are attached to adjacent carbon atoms.

2. Motor fuel tending to deteriorate due to oxygen containing, as an inhibitor for said deterioration, a hydrocarbon dinitroso compound in which the nitrogen atoms are attached to adjacent carbon atoms.

3. Cracked gasoline containing from about 0.001% to about 0.1% by weight of dinitrosobenzene in which the nitrogen atoms are attached to adjacent carbon atoms.

4. Styrene containing from about 0.001% to about 0.1% by weight of dinitrosobenzene in which the nitrogen atoms are attached to adjacent carbon atoms.

5. Edible fats and oils containing from about 0.001% to about 0.1% by weight of dinitrosobenzene in which the nitrogen atoms are attached to adjacent carbon atoms.

6. Lard containing from about 0.001% to about 0.1% by weight of dinitrosobenzene in which the nitrogen atoms are attached to adjacent carbon atoms.

ROBERT H. ROSENWALD.

REFERENCES CITED

The following references are of record in the file of this patent:

UNITED STATES PATENTS

| Number | Name | Date |
|---|---|---|
| 1,982,277 | Winning | Nov. 27, 1934 |
| 2,386,427 | Breck | Oct. 9, 1945 |